Dec. 8, 1970    R. A. COCCIA    3,546,573
VOLTAGE RANGE LIMITING CIRCUITRY MEANS
Filed April 30, 1968
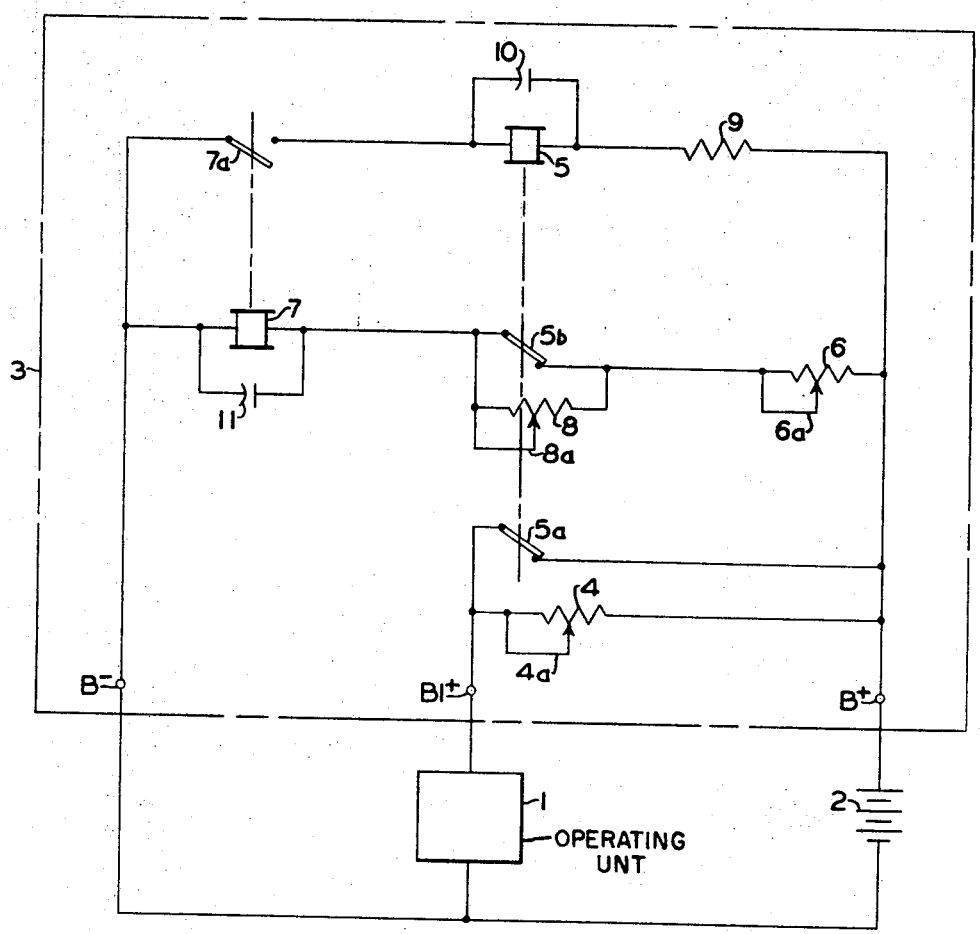
INVENTOR.
RUDOLPH A. COCCIA
BY
ATTORNEY

United States Patent Office 3,546,573
Patented Dec. 8, 1970

3,546,573
VOLTAGE RANGE LIMITING CIRCUITRY MEANS
Rudolph A. Coccia, North Versailles, Pa., assignor to Westinghouse Air Brake Company, Wilmerding, Pa., a corporation of Pennsylvania
Filed Apr. 30, 1968, Ser. No. 725,455
Int. Cl. G05f 3/08, 5/00
U.S. Cl. 323—96      4 Claims

ABSTRACT OF THE DISCLOSURE

A voltage range limiting circuitry comprising circuitry including a voltage responsive control relay for controlling insertion and removal of resistance in a control circuit for regulating a specific range of voltage applied to an operating unit from a variable voltage source. Additional circuitry includes variable resistance for regulating the pick-up and drop-out voltage operating limits of the voltage responsive control relay to a relatively small operating range in a manner to maintain a relatively constant value of the aforesaid applied voltage.

BACKGROUND OF INVENTION

Recently developed rapid transit brake equipments utilize electronic operating units for controlling the electropneumatic brakes thereof, said operating units being supplied with an applied operating voltage which may normally vary between approximately 55 to 74 volts D.C. Due to variable charge conditions of the battery from fully charged to partial charge, the effective load thereon, it has been found that the usual source of voltage supply to the electronic operating units such as a battery operable between 55 to 90 volts D.C. did not always provide the proper voltage, especially at the upper limits of the voltage range. It thus became necessary to provide a means for limiting the operating voltage applied to the electronic operating units so as not to exceed a certain predetermined maximum limit to thereby provide proper operation of the electronic operating unit. One means for accomplishing this was to provide a voltage responsive relay in the circuitry with said electronic operating unit, operative responsively to a certain upper predetermined applied pick-up voltage, to a first posittion wherein a resistor is inserted in said circuitry with said electronic operating unit to limit said upper predetermined applied voltage to a moderate operating degree of applied voltage. An operating characteristic common to most relays of this type was that it was also operative responsively to a lower predetermined applied drop-out voltage at a value substantially lower than both the pick-up voltage and the moderate operating degree of voltage, to a second position to remove said resistor from the said circuitry thereby giving a substantially undesired wide regulation of the upper and lower operating limits of the voltage applied to the electronic operating unit.

SUMMARY OF THE INVENTION

According to the present invention there is provided a reliable and inexpensive applied voltage regulating cicuitry including voltage responsive relays and variable resistors suitably adjusted to limit the applied voltage output range from a variable voltage supply source such as a battery in variously charged conditions. A variable resistor is inserted in the applied voltage circuitry by pick-up of a voltage responsive relay to limit the maximum value of applied voltage and additional variable resistance is inserted to regulate the minimum limit of operation of the voltage responsive relay to minimize the voltage range of pick-up and drop-out of the relay to in turn regulate the maximum and minimum value of applied voltage.

The accompanying single figure shows a schematic diagram of the voltage regulating circuitry embodying the invention.

DESCRIPTION

Referring to the drawing, a voltage range limiting circuit is provided for a so-called operating unit 1 having, for example, an input range limit of a 55 to 74 D.C. voltage impressed across the unit from a battery source 2 having an output which is variable from 0 to 90 volts D.C. due to charge conditions. The voltage protection circuitry is shown within dotted lines simulating a cabinet 3.

It should be noted that all voltages referred to hereinafter are D.C. voltages of values approximated.

The circuitry includes a voltage limiting resistor 4 connected between terminals B1+ and B+ in series with the unit 1, said resistor having a movable contact 4a adjustable thereon to limit the maximum supply voltage from the battery 2 to the unit 1 to a predetermined value. A normally closed contact arm 5a of a relay 5 is connected in parallel with the resistor 4 to shunt the resistor 4 via contact arm 5a until an upper voltage limit is reached as explained hereinafter. A variable resistor 6 with movable contact 6a is connected from the B+ terminal of the battery in series with the winding of a voltage responsive relay 7 by way of the normally closed contact arm 5b of relay 5 and thence to the B— terminal. Contact 6a is adjusted such that relay 7 is energized and the armature picked-up by the voltage from the battery 2 at a predetermined voltage value to thereby pick-up and close a contact arm 7a thereof as explained hereinafter.

With closure of contact arm 7a due to pick-up of relay 7, the winding of relay 5 is energized and the armature thereof picked-up to effect opening of the contact arms 5a and 5b. Opening of contact arm 5a renders the resistor 4 effective to control (by the preset position of movable contact 4a) the voltage applied to the unit 1 to a value set at a desired upper limit explained hereinafter. Simultaneously, opening of contact arm 5b places a variable resistor 8, having a movable contact arm 8a, in series with the resistor 6 and the winding of relay 7 to increase the resistance in series with the winding of relay 7 and thereby decrease the voltage drop across the winding thereof as explained hereinafter.

OPERATION

As an example of operation, assume the unit 1 is operably effective while the voltage applied thereto is bebetween 55 and 74 volts. When the applied voltage is lower than 55 volts the unit 1 is inoperative, and it is desirable to maintain the voltage applied thereto below 74 volts to effectively operate the unit 1.

Assume that as the battery 2 is being charged, the voltage thereof increases from 0 volts to 90 volts. As the battery voltage increases from 0 to 55 volts, it is applied directly to the unit 1 via the contact arm 5a. However, the unit 1 is not operative for applied voltages in such range. Similarly, as the supply voltage at the battery 2 increases within the range of 55 to slightly less than the 74 volts, the desired operating range, such voltage is directly applied to unit 1 via contact arm 5a. When the battery 2 is charged to 74 volts the relay 7 becomes picked-up in a manner explained hereinafter to close contact arm 7a and effect pick-up of relay 5 to open the contact arms 5a and 5b. The value of resistor 6 is predetermined at a value such that when the supply voltage is 74 volts, the voltage across the winding of relay 7 will be approximately 18 volts, a voltage predetermined as the pick-up voltage of relay 7.

With the opening of the contact arm 5a, the resistor 4 is no longer shunted and is of a predetermined value that it now becomes effective to reduce the voltage applied to the unit 1 to approximately 65 volts. During further increase in the supply voltage at the battery from the 74 volts to the full charge of 90 volts, the relay 7 and consequently relay 5 remain picked-up, and the applied voltage at unit 1 accordingly increases from approximately 65 volts to 74 volts in the desired operating range.

As the supply voltage from the battery 2 decreases from 90 to 74 volts due to the discharging thereof after being charged, the applied voltage at the unit 1 accordingly decreases from 74 to 65 volts and the voltage across the relay 7 decreases from approximately 24 volts to 18 volts. As the supply voltage decreases to 74 volts and lower during battery discharge, it is necessary to remove the resistor 4 from the circuitry in order to prevent the voltage applied to the unit 1 from reducing so low as to render the unit 1 inoperative. Removal of resistance 4 is done by closing the contact arm 5a to shunt the resistor, an operation which results from drop-out of relay 5 responsive to drop-out of relay 7. Although the relay 7 is picked-up at 18 volts it does not drop-out until the voltage thereacross has been decreased to approximately 2 volts. Under previous conditions prior to use of the novel circuitry employed herein, this would mean that the supply voltage from the battery would have to decrease so low to effect drop-out of relay 7, as to cause the voltage applied to unit 1 to be too low to render the unit 1 operative. To prevent this, at the time relays 7 and 5 were picked-up, a contact arm 5b of relay 5 is opened to remove a shunt from a resistor 8 with the result that the combination of resistors 6 and 8 in series with the winding of relay 7 greatly reduces the voltage applied thereacross to an amount such that when the supply voltage from the battery decreases a very small amount below 74 volts (for example, one half of a volt to 73.5 volts), the relay 7 will drop-out. With drop-out of relay 7 and consequent drop-out of relay 5, the resistor 4 is again shunted such that the voltage applied to the unit equals in value that supplied from the battery.

It can thus be seen that by use of the additional resistor 8 in the circuitry energizing the winding of relay 7 the voltage range of the supply voltage between pick-up and drop-out thereof is decreased to a minimum to thereby enable a close regulation of the voltage applied to the unit 1.

The resistor 9 and capacitors 10 and 11 shown in the drawing are included for a well-known reason to provide stability to the circuitry during the opening and closing of the various contact arms during the supply voltage variations.

The novel use of a repeater relay 5 in this type of circuitry rather than a single relay 7 insures accurate pick-up of relay 7 for reasons explained as follows. If the relay 7 were used by itself with the contact arm 5b being a contact thereof, it would mean that the energizing voltage of relay 7 would be provided by way of contact arm 5b. As the pick-up point of relay 7 approached, the contact arm 5b would tend to open and arc and thereby increase the resistance in the circuitry to the relay 7 to in turn modify the pick-up voltage thereto. With the use of the repeater relay 5 to control contact arm 5b, the said contact arm is not influenced until relay 7 has already been picked-up, thereby providing a positive point of pick-up to relay 7.

Through the novel use of the resistor 8 under the control of repeater relay 5, uniform control of the voltage applied to the unit 1 may be obtained.

Having now described the invention, what I claim as new and desire to secure by Letters Patent, is:

1. Voltage regulating apparatus for regulating to a predetermined range, the voltage applied to a device to be operated from a variable voltage source, said apparatus comprising:
 (a) a normally shunted resistor disposed in series relation to the source and the device to be operated, effective when unshunted to limit to a certain maximum value the voltage applied to the device to be operated,
 (b) a voltage responsive relay having a winding energized from the voltage source and operative from a dropped-out to a picked-up position when the voltage from the source is equal to or greater than said certain maximum value,
 (c) a repeater relay energized responsively to pick-up of said voltage responsive relay for unshunting said resistor to render it effective, and
 (d) resistance means cut into series-circuit relation with the winding of said voltage responsive relay by energization of said repeater relay to render said voltage responsive relay operatively responsive to reduction of the source voltage a predetermined small amount below said certain maximum value to be restored to its dropped-out position.

2. Voltage regulating apparatus as claimed in claim 1, wherein additional resistance means is provided in series-circuit relation with the winding of the voltage responsive relay to adapt it for pick-up operation when the voltage from the source reaches said certain maximum voltage.

3. Voltage regulating apparatus as claimed in claim 2, wherein drop-out of said repeater relay effects shunting of said resistance means to cause the winding of said voltage responsive relay to be energized from the source via said additional resistance means only.

4. Voltage regulating apparatus for interposition between a source of variable voltage and a device operated thereby, said regulating apparatus comprising:
 (a) resistance means effective to limit to a certain maximum, the voltage applied to the device to be operated thereby,
 (b) a voltage regulating relay means operatively energized by voltage supplied from the source,
 (c) a first regulating resistance means for determining the voltage at which said voltage regulating relay means is operated from one position to a second position,
 (d) a second regulating resistance means effective cooperatively with said first regulating resistance means for regulating a certain minimum voltage at which said voltage regulating relay means is returned from said second position to said one position responsively to reduction of the source voltage, and
 (e) repeater relay means operated responsively to actuation of said voltage regulating relay means to said second position to render said resistance means effective and said second regulating resistance means effective.

References Cited

UNITED STATES PATENTS 2,229,432   1/1941   Amsden _____ 307—130 X
2,606,544   8/1952   Church et al. _____ 323—96 X J D MILLER, Primary Examiner A. D. PELLINEN, Assistant Examiner U.S. Cl. X.R.

317—137; 320—51